(12) United States Patent
Ronald et al.

(10) Patent No.: US 8,040,275 B2
(45) Date of Patent: Oct. 18, 2011

(54) METHOD AND APPARATUS FOR GEOGRAPHIC POSITIONING

(75) Inventors: Douglas S. Ronald, Sunnyvale, CA (US); Tim D. Stevens, Boulder, CO (US); Paul A. Quintana, Morgan Hill, CA (US); Jennifer Wang, Laguna Hills, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 231 days.

(21) Appl. No.: 12/503,361

(22) Filed: Jul. 15, 2009

(65) Prior Publication Data

US 2011/0012781 A1 Jan. 20, 2011

(51) Int. Cl.
*G01S 19/46* (2010.01)
*G01S 5/14* (2006.01)
*G01S 11/10* (2006.01)

(52) U.S. Cl. ............. 342/357.29; 342/357.78; 342/450; 342/461; 342/464; 455/456.1

(58) Field of Classification Search .............. 342/457, 342/458, 461, 464, 357.29, 357.78, 450–452; 455/456.1, 456.2, 456.5, 456.6; 701/207, 701/208, 213–215; *G01S 5/14, 11/10, 19/46*
See application file for complete search history.

(56) References Cited

U.S. PATENT DOCUMENTS

| | | | | |
|---|---|---|---|---|
| 6,470,186 | B1 * | 10/2002 | Whikehart et al. | 455/456.1 |
| 7,346,345 | B2 * | 3/2008 | Ruutu et al. | 455/423 |
| 7,363,043 | B2 * | 4/2008 | Jaeckle et al. | 455/456.6 |
| 2005/0285790 | A1 * | 12/2005 | Gagnon | 342/457 |

FOREIGN PATENT DOCUMENTS

| | | |
|---|---|---|
| DE | 101 47 462 A1 | 4/2003 |
| EP | 1 841 256 A1 | 10/2007 |
| GB | 2 226 731 A | 7/1990 |
| WO | WO 03/027706 A1 | 4/2003 |
| WO | WO 2007/001660 A2 | 1/2007 |
| WO | WO 2008/006077 A2 | 1/2008 |

OTHER PUBLICATIONS

Cprogramming.com: "Linked Lists Tutorial;" found on the Web at http://www.cprogramming.com/tutorial/print/lesson15.html; Copyright 1997-2005; Printable Version (pp. 1-3) and Web version (pp. 1-2): Total: 5 sheets.*
Jul. 6, 2010 International Search Report issued in International Application No. PCT/US2009/050699.

* cited by examiner

*Primary Examiner* — Thomas Tarcza
*Assistant Examiner* — John Vigushin
(74) *Attorney, Agent, or Firm* — Oliff & Berridge, PLC

(57) ABSTRACT

Aspects of the disclosure provide methods for positioning transmitting stations, such as cell towers. Further, aspects of the disclosure provide a database for storing information of the transmitting stations. In addition, aspects of the disclosure provide methods for positioning a moving object having a receiver based on the database of the transmitting stations and wireless signals transmitted by the transmitting stations. The methods increase in-transit location visibility of shipment while reducing GNSS usage, and thus reduce power consumption. The methods allow positioning receiving stations when GNSS signals may not be available, such as due to interference.

14 Claims, 9 Drawing Sheets

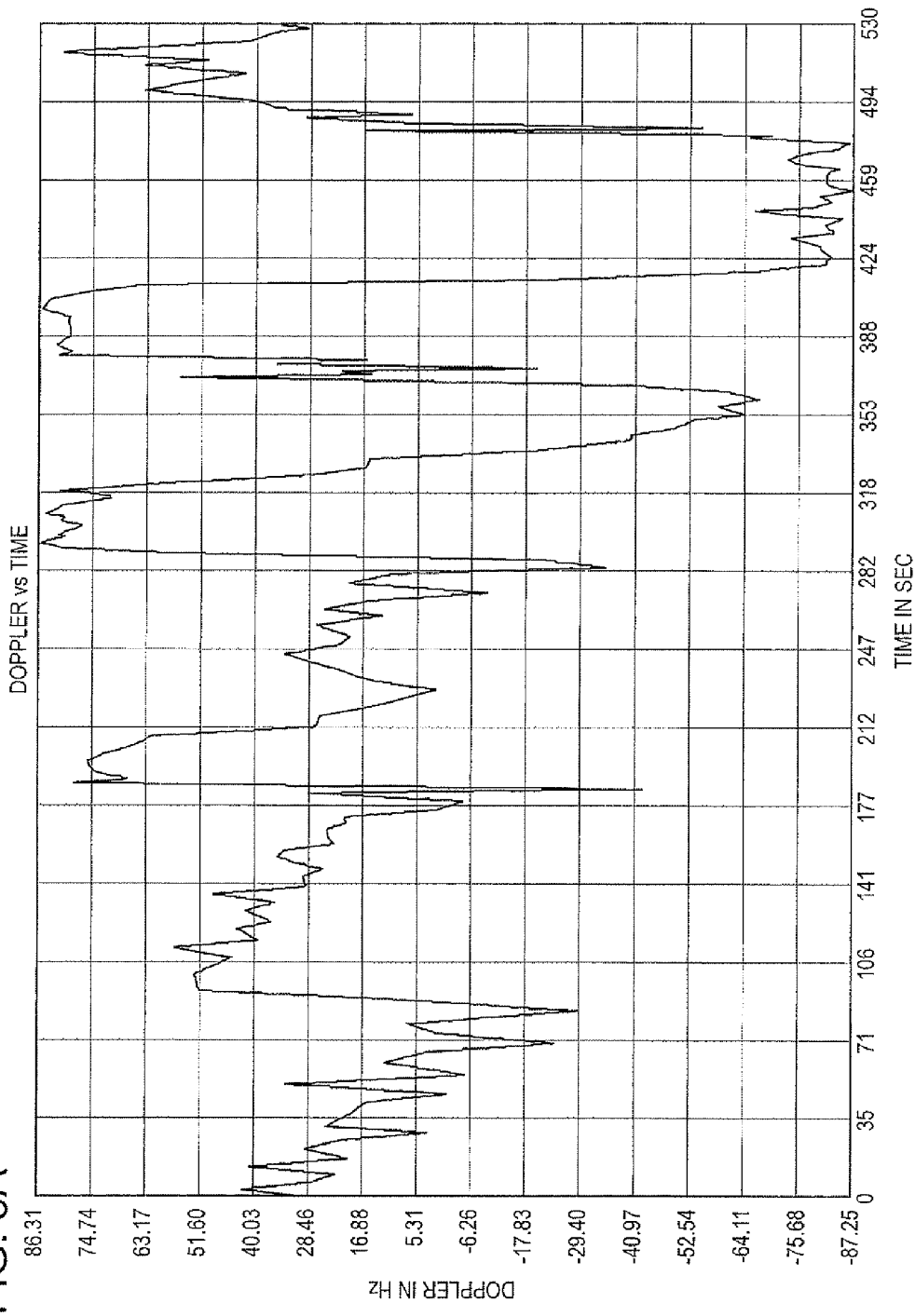

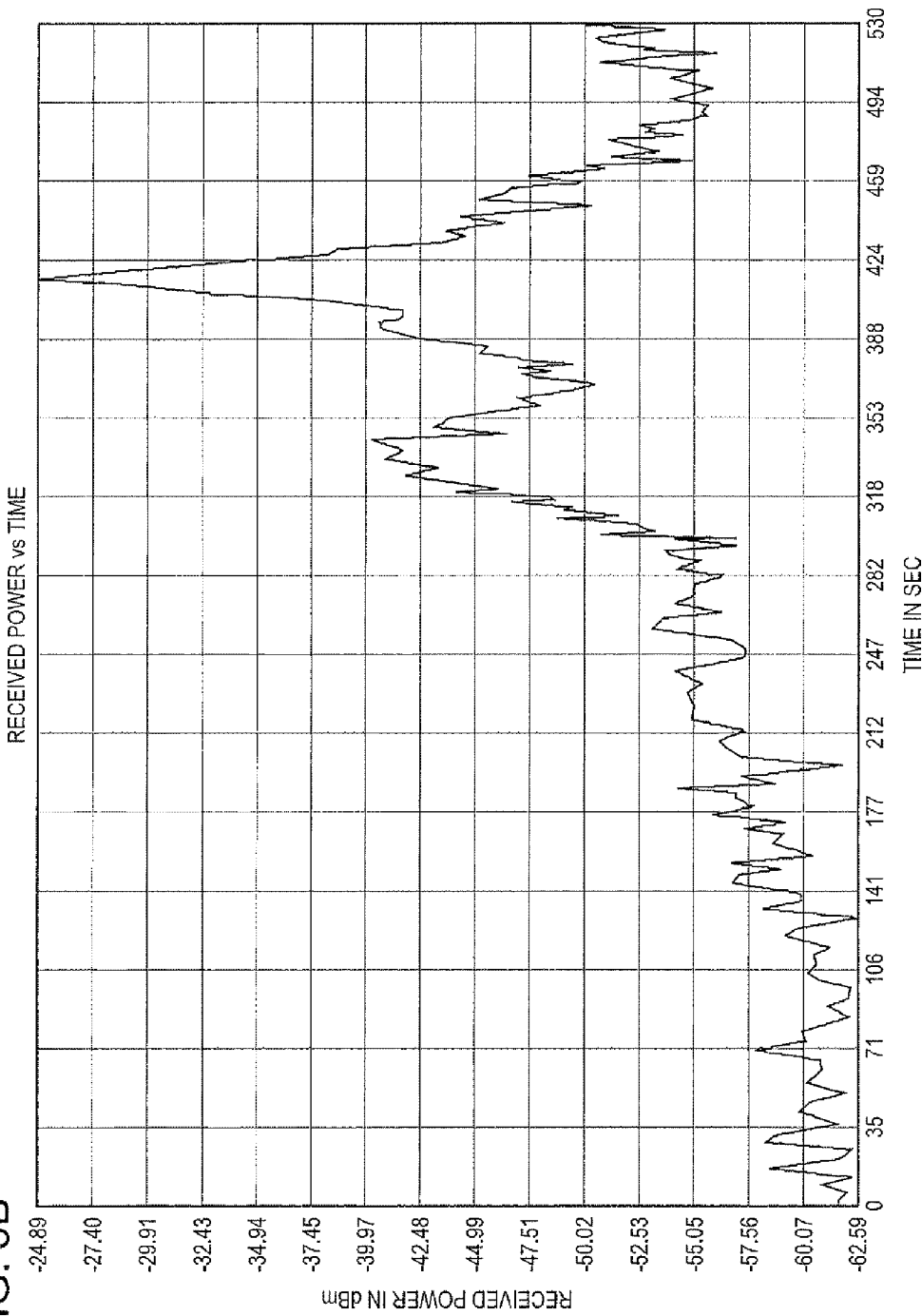

METHOD AND APPARATUS FOR GEOGRAPHIC POSITIONING

BACKGROUND

Logistics management can use shipment location information to manage and optimize, for example, a supply chain. The shipment location information can be provided by a geographic positioning device attached to the shipment. The geographic positioning device can increase in-transit location visibility of the shipment. Thus, the supply chain can be timely and reliably managed.

SUMMARY

Aspects of the disclosure can provide methods for positioning transmitting stations, such as cell towers. Further, aspects of the disclosure can provide a database for storing information of the transmitting stations. In addition, aspects of the disclosure can provide methods for positioning a moving object having a receiver based on the database of the transmitting stations and wireless signals transmitted by the transmitting stations. The methods can increase in-transit location visibility of shipment while reducing global navigation satellite system (GNSS) usage, and thus can reduce power consumption. The methods allow positioning receiving stations when GNSS signals may not be available, such as due to interference.

To geographic position a cell tower, a method can perform a linear least-squares fit to the Doppler information collected by a moving receiver with frequency tuned to received wireless signal that is emitted from the cell tower. The method can compute slant range from the moving receiver to the cell tower for each data sample reported, not necessarily equally spaced in time. Further, range rate can be computed from slant range and other information. Further, the method can calculate a matrix of the partials of range rate with respect to latitude and longitude, and can use the matrix in a Chi Square least squares fit to obtain latitude and longitude corrections. The corrections can be added to the previous iteration's tower location, and the process can continue until convergence is obtained.

To construct a database of cell towers, a method can construct a LinkedWeb including multiple heads and multiple tails configured in a web structure Additionally, the LinkedWeb can include web nodes for cell towers. Each web node can include cell information, such as cell ID, latitude, longitude, signal strength, and the like. In addition, each web node may include mechanism to locate previous node, next node, and the like. Additionally, the LinkedWeb may include hash tables, such as previous node table, next node table, route nodes table, and the like. For example, route nodes table can include nodes along a trade route. The hash tables can improve a lookup speed when traversing a trade route through the web structure.

According to an aspect of the disclosure, a method for geographic positioning a receiver, which can be attached to a moving object, can include storing a location database of station devices fixed on earth surface according to routes of the receiver, receiving wireless signals from one or more station devices at a location on a route, obtaining identifications of the station devices from the wireless signals, searching the location database to obtain locations of the station devices based on the identifications, and determining location coordinates of the receiver based on the locations of the station devices and signal attributes of the wireless signals.

To store the location database of station devices fixed on earth surface according to routes of the receiver, the method can include storing a plurality of station devices in a linked list corresponding to a route of the receiver.

To determine the location coordinates of the receiver based on the locations of the station devices and signal attributes of the wireless signals, the method can include determining the location of the receiver based on at least one of Doppler frequency shift and received signal strength of the wireless signals. In addition, the method can include determining the location of the receiver according to at least one of a trilateration algorithm, a centroid algorithm and a fingerprinting algorithm.

According to another aspect of the disclosure, a method for geographic positioning a transmitting station can include receiving wireless signals from the transmitting station at a plurality of locations on a route near the transmitting station, determining geographic location information of the plurality of locations corresponding to the received wireless signals, and determining location coordinates of the transmitting station based on the geographic location information of the plurality of locations and the wireless signals.

Further, the method can include determining motion information of a moving receiver at the plurality of locations while receiving the wireless signals, and determining the location of the transmitting station based on the motion information at the plurality of locations and Doppler frequency shifts of the received wireless signals.

Alternatively, the method can include determining the location of the transmitting station based on the geographic location information of the plurality of locations and received signal strength indicators of the wireless signals.

In an embodiment, to determine the geographic location information of the plurality of locations corresponding to the received wireless signals, the method can include determining the geographic location information based on a global navigation satellite system (GNSS).

Aspects of the disclosure can provide a geographic positioning device. The geographic positioning device can include a memory unit configured to store a location database of station devices fixed on earth surface according to routes of the receiver, a receiver module configured to receive wireless signals from one or more station devices, and a processor module configured to identify the station devices based on the wireless signals, search the location database to obtain locations of the station devices, and determine location of the geographic positioning device based on the locations of the station devices and the wireless signals.

Further, the geographic positioning device can include a transmitter module configured to transmit a wireless signal including the determined location.

In addition, aspects of the disclosure can provide a geographic positioning device for positing a transmitting station. The geographic positioning device can include a receiver module configured to receive wireless signals from the transmitting station at a plurality of locations on a route near the transmitting station, a global navigation satellite system (GNSS) configured to determine geographic location information of the plurality of locations corresponding to the received wireless signals, and a processor configured to determine a location of the transmitting station based on the geographic location information of the plurality of locations and the wireless signals.

In an example, the GNSS can determine motion information, such as velocity, of the geographic positioning device at the plurality of locations while receiving the wireless signals, and the processor can determine the location coordinates of the transmitting station based on the motion information at the plurality of locations and Doppler frequency shifts of the received wireless signals.

In another example, the processor can be configured to determine the location coordinates of the transmitting station based on the geographic location information of the plurality of locations and received signal strength indicators (RSSI) of the wireless signals.

According to an aspect of the disclosure, the geographic positioning device can further include a memory unit configured to store at least one of Doppler frequency shifts and received signal strength indicators of the wireless signals corresponding to the plurality of locations. The stored data can be used to determine the location coordinates of the transmitting station off-line based on data in the memory unit.

BRIEF DESCRIPTION OF THE DRAWINGS

Various exemplary embodiments of this disclosure will be described in detail with reference to the following figures, wherein like numerals reference like elements, and wherein:

FIG. 5A shows a plot of an exemplary Doppler frequency measurement for the scenario in FIG. 4;

FIG. 5B shows a plot of an exemplary signal strength measurement for the scenario in FIG. 4;

DETAILED DESCRIPTION OF EMBODIMENTS

Figure 1:
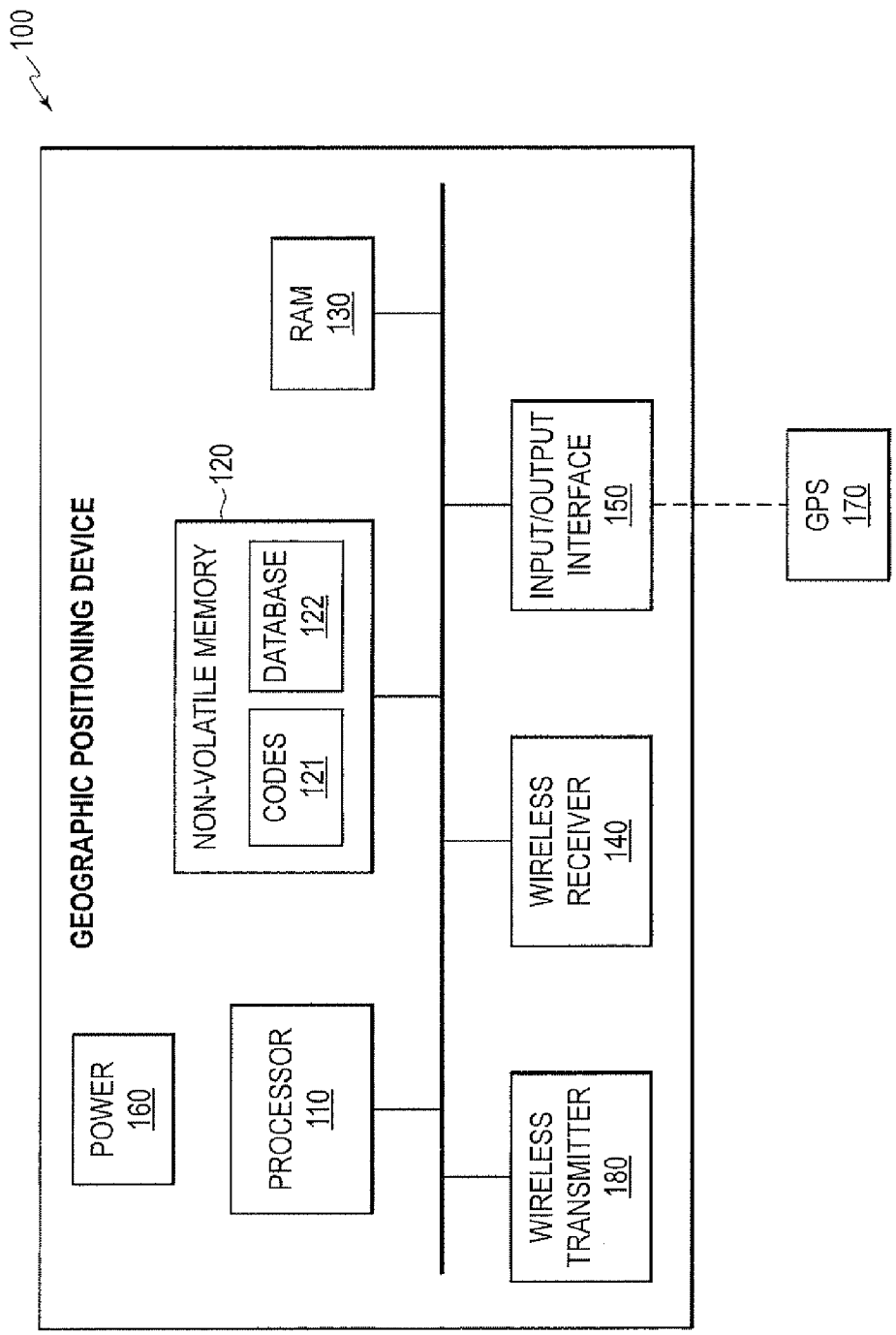
FIG. 1 shows a block diagram of an exemplary geographic positioning apparatus according to an embodiment of the disclosure.

FIG. 1 shows a block diagram of an exemplary geographic positioning device according to an embodiment of the disclosure. The geographic positioning device 100 can include a processor 110, a non-volatile memory 120, a random access memory (RAM) unit 130, a wireless receiver 140, a wireless transmitter 180 and a power module 160. Additionally, the geographic positioning device 100 may include an input/output (I/O) interface 150 that can couple other device to the geographic positioning device 100. These elements can be coupled together as shown in FIG. 1.

The power module 160 can provide electric power to various portions of the geographic positioning device 100. In an embodiment, the power module 160 can include a battery pack that can provide the electric power for the geographic positioning device 100. The battery pack can be rechargeable or non-rechargeable. According to the disclosure, the geographic positioning device 100 can be attached to a moving object, such as a shipment container, and determine positions of the shipment container with a reduced power consumption. Thus, the power module 160 can sustain the geographic positioning device 100 for an increased time duration.

In an example, the geographic positioning device 100 may include a global navigation satellite system (GNSS), which can be built in the geographic position device 100 or can be coupled to the geographic positioning device 100 via the IO interface 150, as shown by a global positioning system (GPS) 170 in FIG. 1. The GNSS is satellite based positioning system, and can determine the shipment container geographic information, such as location, velocity, time, and the like, anywhere. However, the GNSS can consume a significant portion of a total power consumption, for example, 40% of the total power consumption of the geographic positioning device 100 when the GNSS turns on every 30 minutes. The geographic positioning device 100 may use another geographic positioning mechanism, such as a cell-tower based positioning mechanism, that consumes less power than the GNSS, and reduce the turn-on frequency of the GNSS, or even remove the GNSS from the geographic positioning device 100. Thus, the geographic positioning device 100 can have a reduced power consumption, and the battery pack in the power module 160 can have an extended usage time.

The processor 110 of the geographic positioning device 100 can execute system and application codes. In an example, the processor module 110 may execute codes to determine a location of the geographic positioning device 100 based on wireless signals received from a plurality of cell towers. In another example, the processor module 110 may execute codes to turn-on the GNSS to determine the location of the geographic positioning device 100. In another example, the processor module 110 may execute codes to determine a location of a neighboring cell tower based on wireless signals received by the geographic positioning device 100 and geographic information of the geographic positioning device 100, which can be obtained from the GNSS. In another example, the processor module 110 may execute codes to update a location database for cell towers.

The non-volatile memory 120 can hold information even when power is off. Therefore, the non-volatile memory 120 can be used to store system and application codes, such as the codes to determine the location of the geographic position device 100 based on wireless signals received from a plurality of cell towers, the codes to determine the location of a neighboring cell tower based on wireless signals received by the geographic position device 100 and geographic information of the geographic positioning device 100, and the like. In addition, the non-volatile memory 120 may store various data, such as a location database for wireless cell towers, and the like.

The RAM unit 130 is readable and writable. Generally, the RAM unit 130 can have a fast access speed. It can be preferred that the data and the codes are stored in the RAM unit 130 during operation, such that the processor 110 can access the RAM unit 130 for the codes and the data instead of the non-volatile memory 120.

The wireless receiver 140 can receive wireless signals from station devices, which generally do not move. In an example, the wireless receiver 140 can be configured to receive wireless signals from cell towers. The wireless receiver 140 can process the wireless signals according to suitable wireless standards, obtain various information from the wireless signals. The various information can be stored for further processing. In an example, the wireless receiver 140 may decode data packets from received wireless signals. The data packets can generally include an identification of the cell tower, such as a cell ID.

In another example, the wireless receiver 140 may provide Doppler shift information obtained from the wireless signals. More specifically, the wireless receiver 140 may lock an internal clock to the received wireless signals. Due to the Doppler effect, the received wireless signals can have a frequency shift, when the geographic positioning device 100 moves with regard to the cell tower that emits the wireless signals. Accordingly, the frequency of internal clock may vary as a function of the velocity of the geographic position device 100. The wireless receiver 140 can obtain the frequency shift of the internal clock. The frequency shift can be stored for further processing.

In another example, the wireless receiver 140 can obtain a received signal strength indicator (RSSI) from the wireless signals. The received signal strength indicator can be related to a distance between the geographic positioning device 100 and the cell tower.

The wireless transmitter 180 can be configured to transmit a wireless signal to inform a geographic location of the geographic positioning device 100. The geographic location information can be received by, for example, a logistic management system. The logistic management system can use the geographic location information to mange a supply chain.

It is noted that the geographic positioning device 100 can be suitably configured for use in various situations. In an embodiment, the geographic positioning device 100 can be configured as a radio frequency identification (RF ID) tag that can be attached on a swinging door of a shipment container. The RF ID tag may include an inside portion that can include the battery, the processor, and the like, and an outside portion that can include the GNSS and a wireless modem for receiving and transmitting wireless signals.

Additionally, the geographic positioning device 100 can be suitably configured into various modes, such as a probe mode, a GNSS positioning mode, a reduced-power positioning mode, and a reporting mode, and the like. In the probe mode, the geographic positioning device 100 can be configured to determine a location of a wireless transmitting station, such as a cell tower, based on wireless signals emitted from the cell tower and received by the geographic positioning device 100. In the GNSS positioning mode, the geographic positioning device 100 can be configured to determine the location of the geographic positioning device 100 based on the GNSS. In the reduced-power positioning mode, the geographic positioning device 100 can be configured to determine the location of the geographic positioning device 100 based on wireless signals received from a plurality of cell towers, for example. In the reporting mode, the geographic positioning device 100 can be configured to turn on the wireless transmitter 180 to transmit wireless signals to inform, for example, a logistic server, locations of the geographic positioning device 100.

In an example, the geographic positioning device 100 may include a GNSS, or a GNSS can be coupled to the geographic positioning device 100, such that the geographic positioning device 100 can be configured into the probe mode, the GNSS positioning mode, the reduced-power positioning mode, and the reporting mode. In another example, the geographic positioning device 100 does not include a GNSS. The geographic positioning device 100 can be configured into the reduced-power positioning mode, and the reporting mode.

When the geographic positioning device 100 is configured into the probe mode, the processor 110 can turn on the wireless receiver 140 to receive wireless signals from, for example, a cell tower, at a plurality of sample points. The plurality of sample points can be evenly spaced in time or can be not evenly spaced in time. The wireless receiver 140 can obtain various signal attributes, such as Doppler frequency shifts, RSSIs, and the like, from the received wireless signals. Further, the wireless signals can be decoded, and the processor 110 may obtain, for example, a cell ID, from the decoded signals. In addition, the processor 110 may turn on the GNSS, and measure geographic information and/or motion information at the plurality of sampling points, respectively. The signal attributes, the geographic information and/or the motion information of the plurality of sampling points can be stored in association with the cell ID in the RAM unit 130, for off-line processing.

During the off-line processing, the processor 110, or other processors that can read the stored information at the plurality of sampling points, may execute codes for determining the location of the cell tower based on the signal attributes, the geographic information, and/or the motion information of the plurality of sampling points. In an embodiment, the processor 110 may execute codes for determining the location of the cell tower based on the Doppler frequency shifts, the geographic information and the motion information of the plurality of sampling points. In another embodiment, the processor 110 may execute codes for determining the location of the cell tower based on the RSSI and the geographic information of the plurality of sampling points. Additionally, the processor 110 may store the location of the cell tower in association with the cell ID in the location database.

When the geographic positioning device 100 is configured into the reduced-power position mode, for example, the processor 110 can turn on the wireless receiver 140 to receive wireless signals from a plurality of cell towers. The wireless receiver 140 can obtain various signal attributes, such as Doppler frequency shifts, RSSIs, and the like. In addition, the wireless signals can be decoded. The processor 110 can obtain cell IDs of the plurality of cell towers from the decoded wireless signals. Further, the processor 110 can obtain the geographic locations of the plurality of cell towers from the location database based on the cell ID. Then, the processor 110 can determine the location of the geographic positioning devices 100 based on the locations of the cell towers and wireless signals received by the geographic positioning device 100 according to various algorithms, such as a trilateration algorithm, a centroid algorithm, a database correlation (e.g., fingerprinting) algorithm, and the like.

For ease and clarity of description, the embodiments are presented with a bus type architecture, however, it should be understood that any other architectures can also be used to couple components inside geographic positioning device 100.

Figure 2:
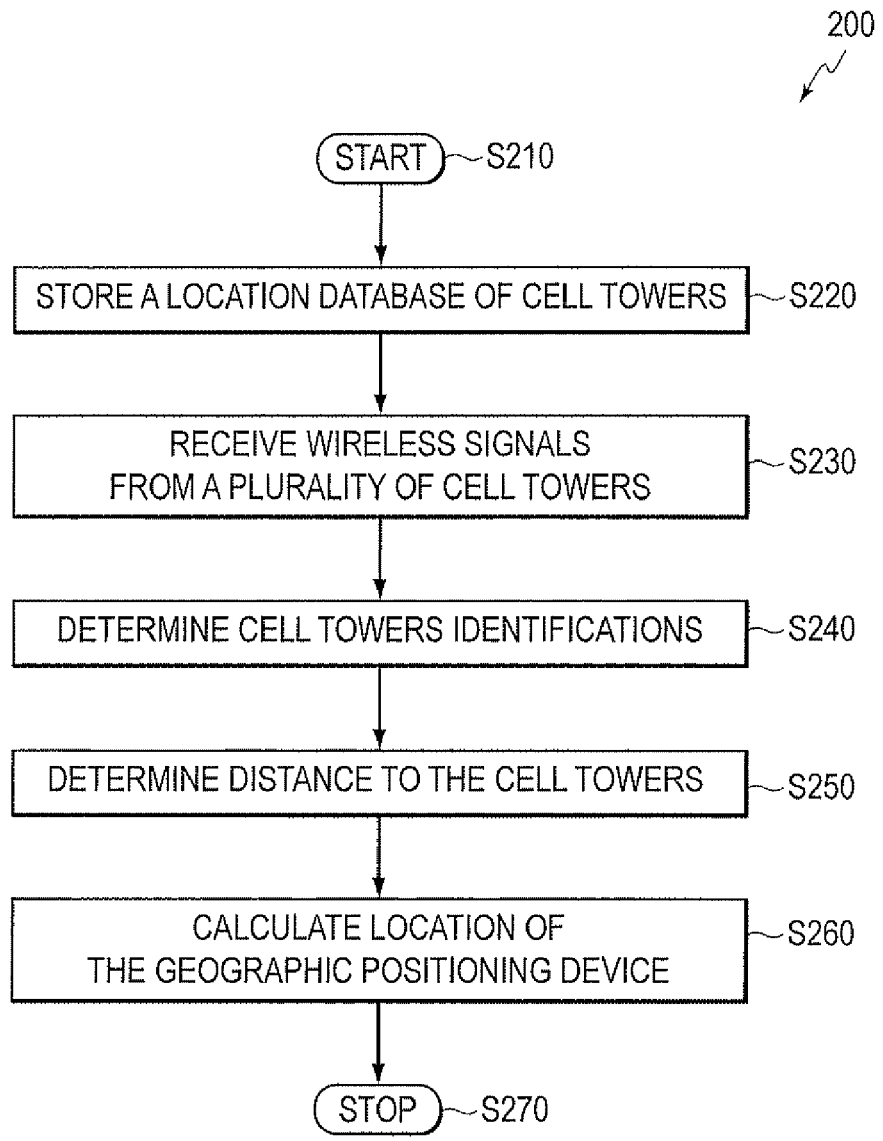
FIG. 2 shows a flow chart outlining an exemplary geographic positioning process for a moving object according to an embodiment of the disclosure.

FIG. 2 shows a flow chart outlining an exemplary geographic positioning process for a moving object according to an embodiment of the disclosure. The geographic positioning process can be performed by a geographic positioning device, such as the geographic positioning device 100, attached to the moving object. The geographic positioning process starts at step S210, and proceeds to step S220.

In step S220, the geographic positioning device can store a location database of station devices, such as cell towers, and the like. The location database of cell towers can be constructed in a web structure, such as LinkedWeb. The LinkedWeb can have multiple heads and multiple tails configured in a web structure. Additionally, the LinkedWeb can include web nodes for cell towers. Each web node can include cell information, such as cell ID, latitude, longitude, signal strength, and the like. In addition, each web node may include a mechanism to locate previous node, next node, and the like. Additionally, the LinkedWeb may include hash tables, such as previous table, next table, nodes table, and the like. For example, the nodes table can include nodes along a trade route and can improve a lookup speed when traversing the trade route through the web structure.

In addition, the location database of cell towers can be constructed by various mechanisms. In an embodiment, the location database of cell towers can be provided by cell phone carriers. In another embodiment, the location database of cell towers can be constructed and updated according to a method of geographic positioning for wireless transmitting station.

In an example, the location database can be managed and updated by a logistic management system. The logistic management system can initiate the geographic positioning device and provide the location database of cell towers to the geographic positioning device. Then, the geographic positioning device can be attached to the moving object, and the process proceeds to step S230.

In step S230, the geographic positioning device can receive wireless signals from a plurality of cell towers. For example, the geographic positioning device may include a wireless receiver that can receive wireless signals. At a location, the wireless receiver may tune its parameters to receive wireless signals from the plurality of cell towers respectively. Then, the process proceeds to step S240.

In step S240, the geographic positioning device can determine identification of the cell towers from the wireless signals. Generally, a cell tower can encode its identification in a header of a packet, and transmit a wireless signal corresponding to the packet. The geographic positioning device may decode the wireless signal based on a suitable wireless communication standard, and obtain the identification of the cell tower. The process then proceeds to step S250.

In step S250, the geographic positioning device may determine distances to the cell towers. For example, the geographic positioning device may obtain a RSSI of the wireless signals from a cell tower. The RSSI can be related to distance between the geographic positioning device and the cell tower. Thus, the geographic positioning device can determine the distance based on the RSSI.

In step S260, the geographic position device can calculate its location based on the locations of the wireless cell towers, and the distances of the geographic position device to the wireless cell towers, such as using a trilateration algorithm. Then, the process proceeds to step S270 and terminates.

It is noted that the process 200 in FIG. 2 can be suitably modified to use other algorithms to calculate the location of the geographic positioning device. In an embodiment, the geographic position device can calculate its location based on a centroid algorithm. The centroid algorithm can determine the location of the geographic positioning device as a geometric center of the plurality of cell towers. The centroid algorithm can calculate the geometric center by a sum of weighted cell tower locations. Each cell tower location can be weighted based on corresponding received signal strength indicator.

In another embodiment, the geographic position device can determine the location based on a database correlation method (DCM). In an example, each web node in the location database may include a power delay profile from the web node. The geographic position device may determine power signatures of the wireless signals from the plurality of cell towers, such as a set of radio signal strengths. Then, the geographic position device can determine its location by mapping the set of radio signal strengths to the database.

It is also noted that the one or more steps of the geographic positioning process can be repetitively performed. For example, the step S230 to S260 can be repetitively performed along a route of the moving object to determine locations of the moving object at various times.

Additionally, the geographic position device may store the location corresponding to a time mark. Further, the geographic position device may turn on a transmitter to inform the logistic server of the location and the time mark via the cell phone communication.

Figure 3:
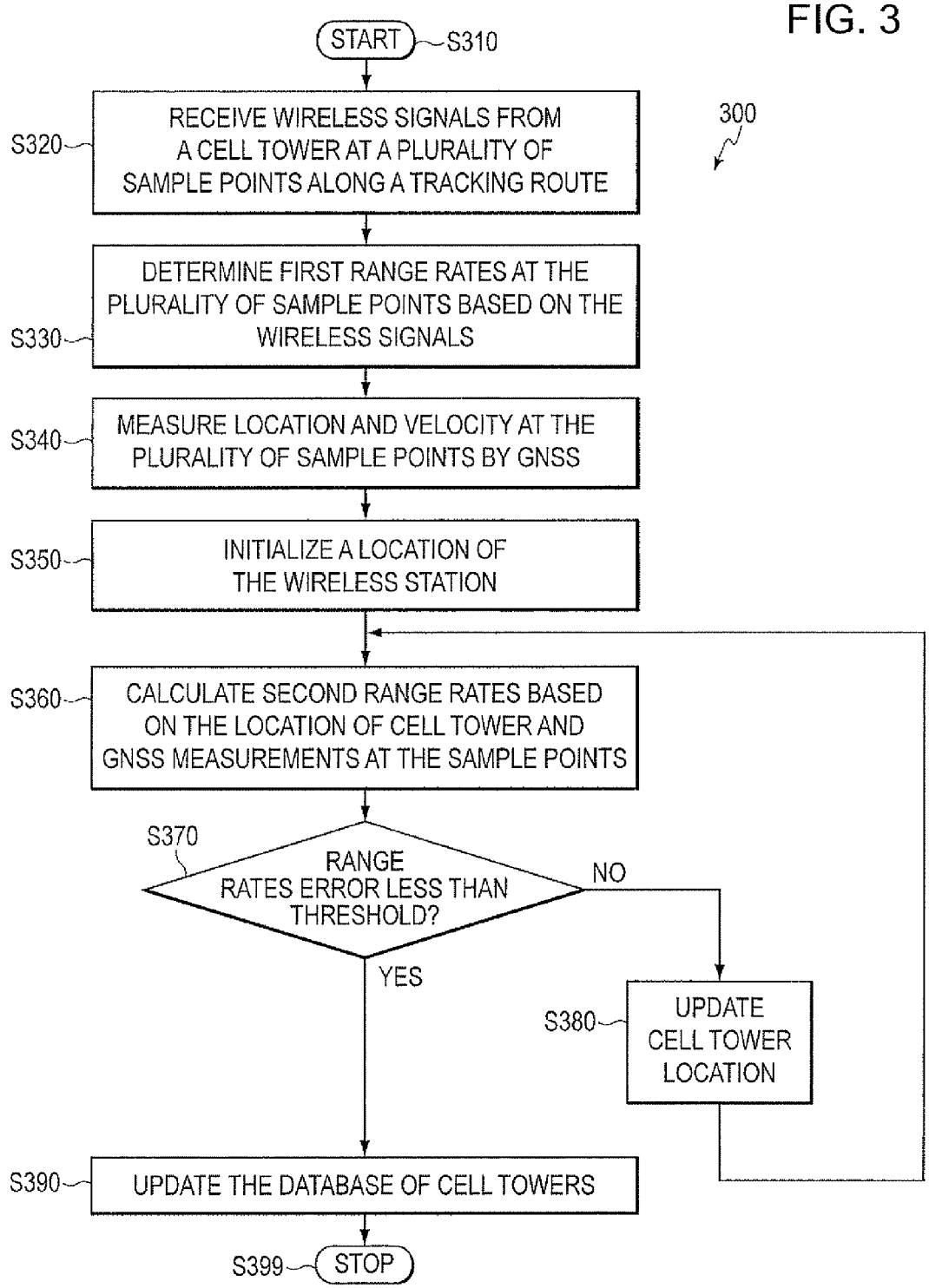
FIG. 3 shows a flow chart outlining an exemplary geographic positioning process for a stationary transmitting device according to an embodiment of the disclosure.

FIG. 3 shows a flow chart outlining an exemplary geographic positioning process for a transmitting station according to an embodiment of the disclosure. The transmitting station can correspond to a stationary device that can emit wireless signals, such as a cell tower. The geographic positioning process 300 can be performed by a geographic positioning device, such as the geographic positioning device 100 configured in a probe mode. The process starts at step S310, and proceeds to step S320.

In step S320, the geographic positioning device can receive wireless signals from a cell tower at a plurality of sample points along a tracking route. The plurality of sample points are not required to be evenly spaced in time. In an example, the geographic positioning device can be attached to a shipment container. The shipment container may be transported following the tracking route. When, the shipment container is within a neighborhood of the cell tower, the geographic positioning device can receive wireless signals from the cell tower. In an embodiment, the geographic positioning device may obtain a cell ID from the wireless signals, and determine whether the cell ID is in a location database or consistent with information in the location database. When the cell ID is not in the location database, or is not consistent with information in the location database, the process proceeds to step S330.

In step S330, the geographic positioning device can determine a first plurality of range rates corresponding to the plurality of sample points based on the wireless signals. In an example, the geographic positioning device can determine Doppler frequency shifts from the wireless signals received at the plurality of sample points. The Doppler frequency shifts are related to the range rates according to Doppler effects, and can be used to obtain the first plurality of range rates. The process then proceeds to step S340.

In step S340, the geographic positioning device can determine geographic information and motion information at the plurality of sample points. For example, the geographic positioning device can turn on the GNSS and measure the geographic information and the motion information, such as velocity at the same time of receiving the wireless signals at the plurality of sample points. Then, the process proceeds to step S350.

In step S350, the geographic positioning device can initiate a location of the cell tower. In an example, the geographic positioning device may initiate an educated guess of the cell tower location. Then, the process proceeds to step S360.

In step S360, the geographic positioning device can calculate a second plurality of range rates based on the geographic information, the motion information and the cell tower location. Then, the process proceeds to step S370.

In step S370, the geographic positioning device can determine whether range rate errors between the first plurality and the second plurality of range rates are less than a threshold. When the range rate errors are less than the threshold, the process proceeds to step S390, otherwise the process proceeds to step S380.

In step S380, the geographic positioning device can update the location of the cell tower based on the range rate errors. For example, the geographic positioning device can calculate a matrix of range rate partials with respect to latitude and longitude, and can use the matrix in, for example, a Chi Square least square fit to obtain latitude and longitude corrections. The corrections can be added to the cell tower location to update the cell tower location. Then, the process returns to step S360.

In step S390, the geographic positioning device can update the database of cell towers. In an embodiment, the geographic positioning device may insert a web node corresponding to the cell tower in the database. The web node can include various information of the cell tower, such as cell ID, latitude, longitude, and the like. Then, the process proceeds to step S399 and terminates.

It is noted that the process 300 can be suitably adjusted. In an example, step S320-S340 can be performed repetitively for multiple cell towers. The geographic positioning device may store Doppler frequency shifts, geographic information and motion information at the plurality of sample points in association with corresponding cell towers in a memory. The stored information can enable the geographic positioning device, or other device that can access the memory, to determine the locations of the cell towers off-line.

It is also noted that the process 300 can be suitably adjusted to determine the location of the cell tower based on RSSI measurement instead of Doppler frequency measurements. For example, in step S330, the geographic positioning device may determine a first plurality of ranges instead of range rates at the plurality of sample points. The first plurality of ranges can be determined based on the RSSI measurements. Similarly, in step S360, the geographic positioning device may determine a second plurality of ranges instead of range rates.

Figure 4:
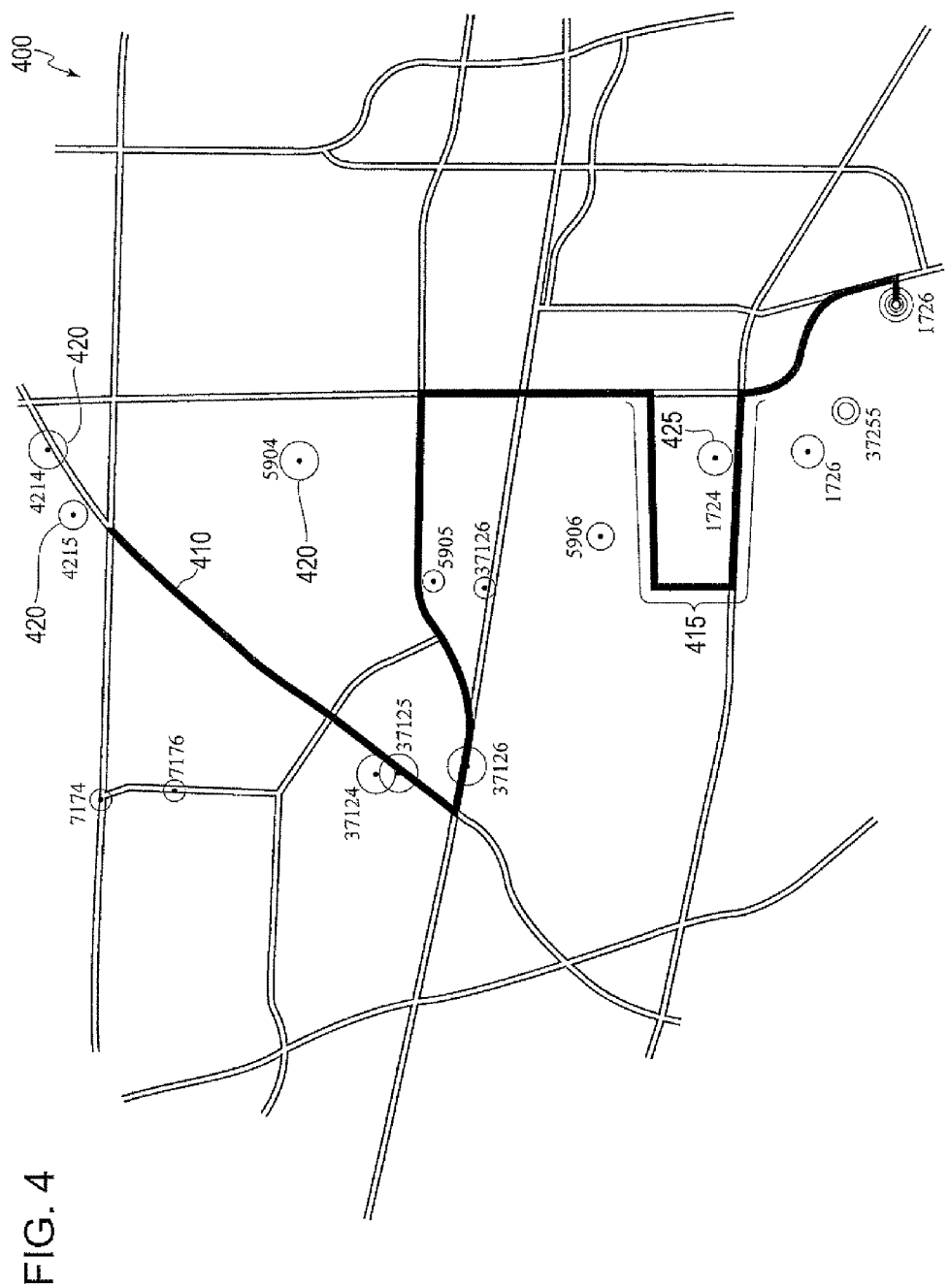
FIG. 4 shows an exemplary scenario for geographic positioning a stationary transmitting device according to an embodiment of the disclosure.

FIG. 4 shows an exemplary scenario for geographic positioning a cell tower according to an embodiment of the disclosure. The scenario 400 can show multiple cell towers 420 along a route 410 of a moving object. The moving object may include a geographic positioning device that can be configured in the probe mode. When the moving object moves along the route 410, for example, going up, the geographic positioning device may be in the neighborhood of the cell towers and can receive wireless signals from the cell towers. In addition, the geographic positioning device may turn on a GNSS and measure geographic information and motion information of the geographic positioning device.

In an example, the geographic positioning device may receive wireless signals from a cell tower 425 along a portion 415 of the route 410 every 5 seconds. The geographic positioning device may obtain various information from the wireless signals, such as Doppler frequency shifts, RSSI, cell ID, and the like. In addition, the geographic positioning device can measure a location and a velocity of the geographic positioning device by GNSS at the time of receiving the wireless signals. In an embodiment, the geographic positioning device can store sampled data and measured data for off-line calculation.

FIG. 5A shows a plot of an exemplary Doppler frequency measurement for the scenario in FIG. 4. The X axis shows the time in seconds, and the Y axis shows Doppler frequency shifts relative to the transmitting frequency of the cell tower.

FIG. 5B shows a plot of an exemplary signal strength measurement for the scenario in FIG. 4. The X axis shows the time in seconds, and the Y axis shows received signal power, which is related to the received signal strength indicator.

Figure 6:
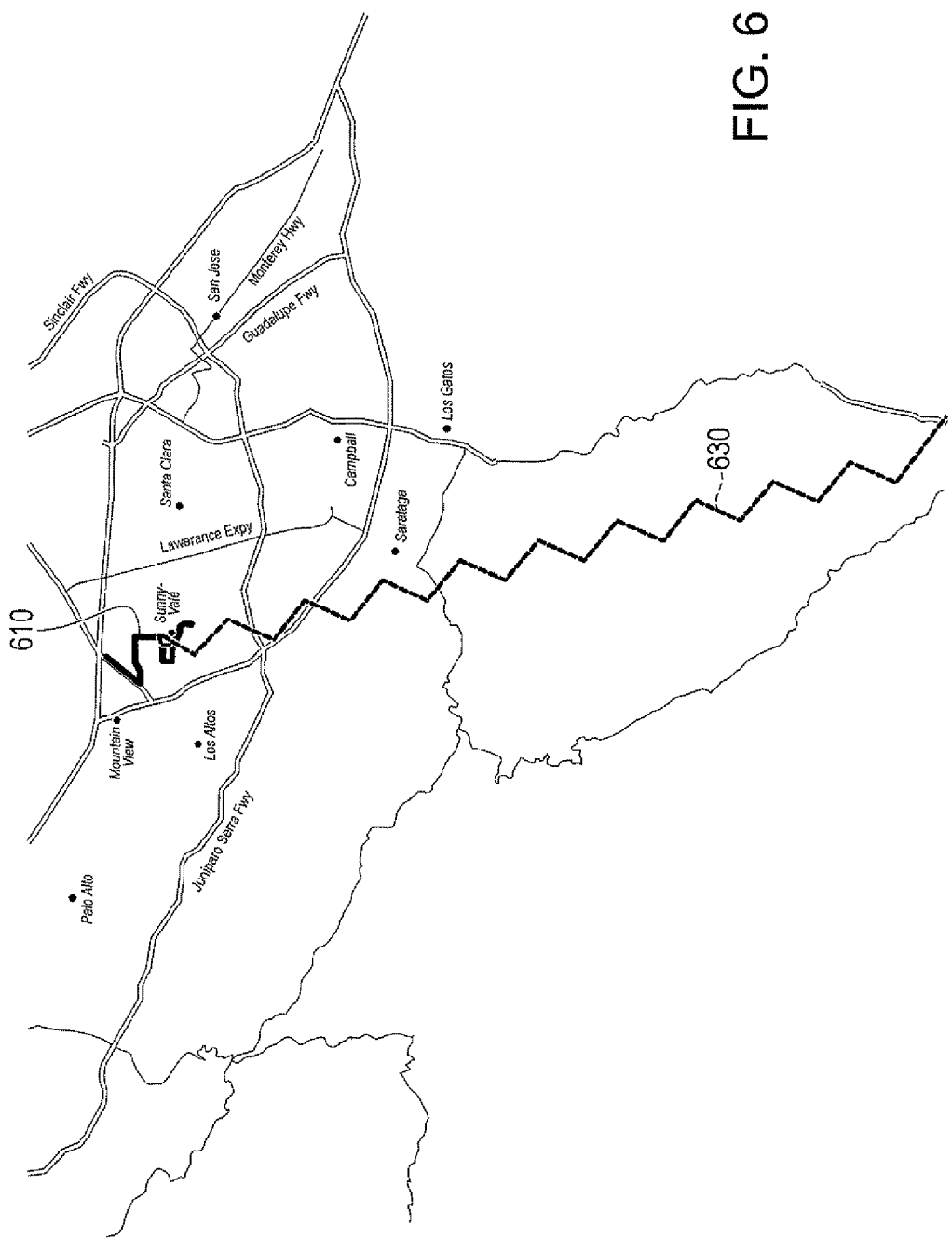
FIG. 6 shows a plot for geographic positioning a stationary transmitting device.

FIG. 6 shows a zoom-out plot for geographic positioning the cell tower 425 in FIG. 4. The route 610 can correspond to the route 410 in FIG. 4. During an off-line calculation, the geographic positioning device may initiate a cell tower location (the lowest point along line 630) that can be far away from the real cell tower location. The geographic positioning device can iteratively update the cell tower location until convergence, as shown by line 630.

Figure 7:
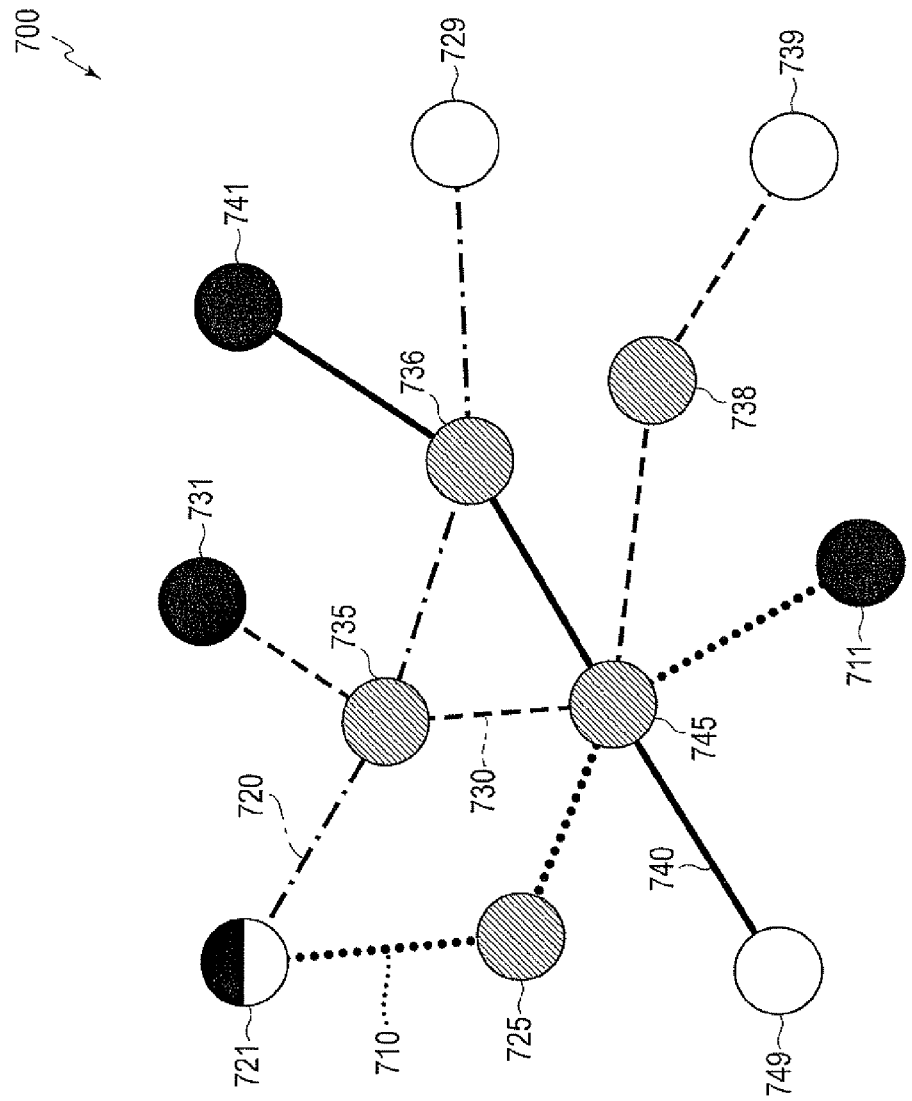
FIG. 7 shows a plot of an exemplary data structure according to an embodiment of the disclosure.

FIG. 7 shows a plot of an exemplary data structure Linked-Web according to an embodiment of the disclosure. The data structure LinkedWeb can be constructed in a web structure. The data structure LinkedWeb can include multiple heads, such as 711, 721, 731 and 741 and multiple tails, such as 721, 729, 739 and 749. Further, the data structure LinkedWeb can include web nodes, such as 725, 745, 735, 736 and 738. Additionally, the LinkedWeb may include hash tables to increase look-up speed. For example, the LinkedWeb may include nodes table for trade routes. In the FIG. 7 example, trade route 710 can include head node 711, web nodes 725 and 745, and tail node 721; trade route 720 can include head node 721, web nodes 735 and 735 and tail node 729; trade route 730 can head node 731, web nodes 735, 745 and 738, and tail node 721; and trade route 740 can head node 741, web nodes 736 and 745, and tail node 749. Each web node can be defined corresponding to a cell tower. The web node may include cell tower information, such as cell ID, latitude, longitude, signal strength, and the like.

Figure 8:
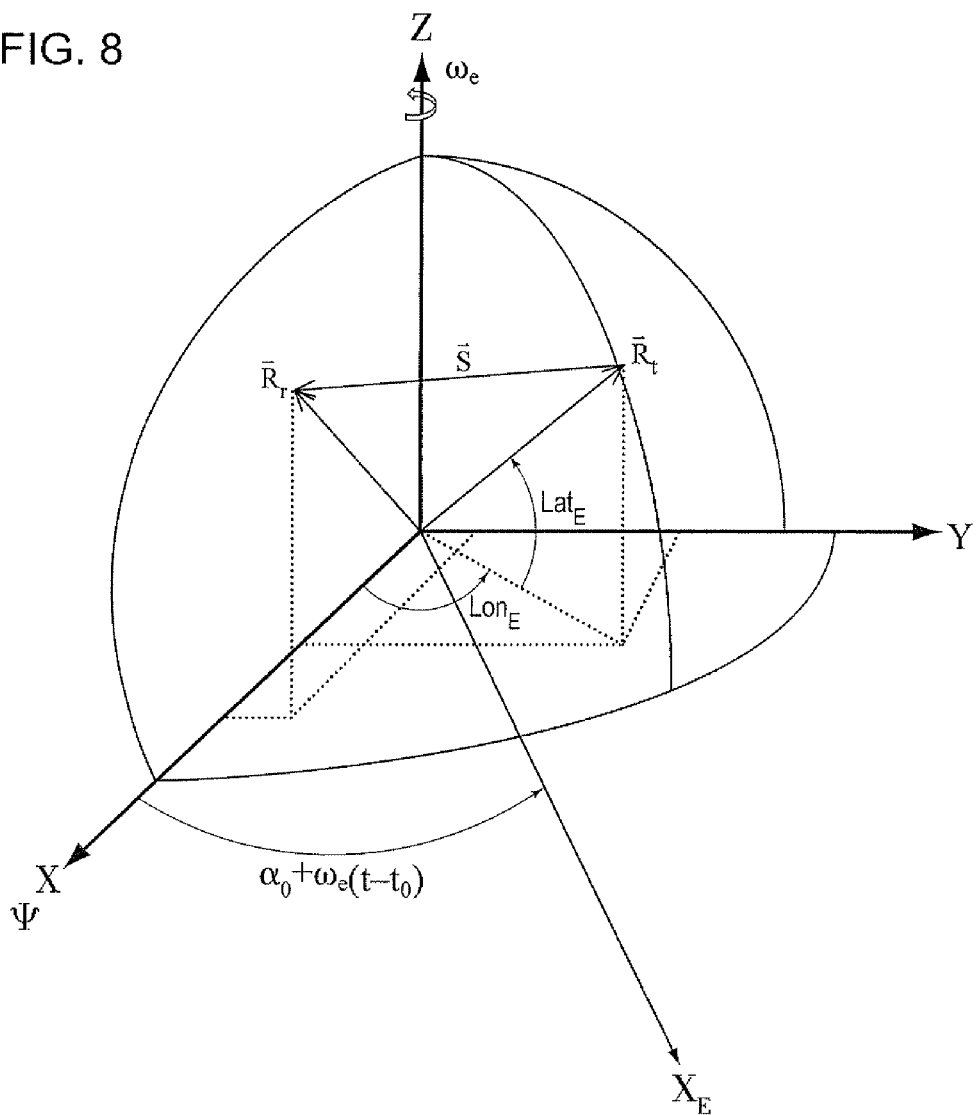
FIG. 8 shows a plot of an earth coordinate system according to an embodiment of the disclosure.

FIG. 8 shows a plot of earth coordinate system according to an embodiment of the disclosure. When a location on the earth surface is given by latitude and longitude, the location can be suitably converted in the Cartesian coordinate system. $\vec{R}_r$ denotes a location vector for a receiver, such as the geographic positioning device 100, and $\vec{R}_t$ denotes a location vector for a transmitter, such as a cell tower.

In an embodiment to position a cell tower, the geographic positioning device may use a Doppler based algorithm to determine the location of the cell tower based on Doppler frequency shift measurements. The Doppler based algorithm can be shown by (D1) to (D7).

(D1) determine a first plurality of range rates $[|\$]\$\~\$\$ [|\$]\$\~ A\dot{P}\tilde{S}_1, [|\$]\$\~\$\$[|\$]\$\~ A\dot{P}\tilde{S}_2, [|\$]\$\~\$\$[|\$]\$\~ A\dot{P}\tilde{S}_3, \ldots, [|\$]\$\~\$\$[|\$]\$\~ A\dot{P}\tilde{S}_n$ corresponding to N sample points based on Doppler frequency shift measurements;

(D2) start with an initial estimate of latitude, longitude for the cell tower location:

$$\begin{pmatrix} \phi_0 \\ \lambda_0 \end{pmatrix}$$

(D3) for a cell tower location $$\begin{pmatrix} \phi_i \\ \lambda_i \end{pmatrix},$$

calculate a second plurality of range rates $\dot{S}_{1i}, \dot{S}_{2i}, \dot{S}_{3i}, \ldots, \dot{S}_{ni}$ based on GNSS measurements and FIG. 8 as shown by Eq. 1-Eq. 10

$$Lon_l = Lon_E + \alpha_0 + \omega_e(t - t_0) \qquad \text{Eq. 1}$$

$$\vec{R}_t = R_t \begin{bmatrix} \cos Lat_E \cos Lon_l \\ \cos Lat_E \sin Lon_l \\ \sin Lat_E \end{bmatrix} = \begin{pmatrix} X_t \\ Y_t \\ Z_t + alt \end{pmatrix} \qquad \text{Eq. 2}$$

$$\dot{\vec{R}}_t = \omega_e R_t \begin{bmatrix} -\cos Lat_E \sin Lon_l \\ \cos Lat_E \cos Lon_l \\ 0 \end{bmatrix} = \begin{pmatrix} \dot{X}_t \\ \dot{Y}_t \\ \dot{Z}_t \end{pmatrix} \qquad \text{Eq. 3}$$

$$v_x = \frac{dR_x}{dt} = \frac{\Delta R_x}{\Delta t} = \frac{R_{2x} - R_{1x}}{\Delta t} \qquad \text{Eq. 4}$$

-continued $$v_y = \frac{dR_y}{dt} = \frac{\Delta R_y}{\Delta t} = \frac{R_{2_y} - R_{1_y}}{\Delta t}$$ Eq. 5

$$v_z = \frac{dR_z}{dt} = \frac{\Delta R_z}{\Delta t} = \frac{R_{2_z} - R_{1_z}}{\Delta t}$$ Eq. 6

$$\dot{\vec{R}}_r = \begin{pmatrix} \dot{X}_r \\ \dot{Y}_r \\ \dot{Z}_r \end{pmatrix} = \begin{pmatrix} v_x \\ v_y \\ v_z \end{pmatrix}$$ Eq. 7

$$\dot{\vec{S}} = \dot{\vec{R}}_r - \dot{\vec{R}}_t$$ Eq. 8

$$S = \sqrt{(X_r - X_t)^2 + (Y_r - Y_t)^2 + (Z_r - Z_t)^2}$$ Eq. 9

$$\dot{S} = \frac{\dot{\vec{S}} \cdot \vec{S}}{S}$$ Eq. 10

It is noted that the velocity vector for the receiver $\vec{R}_r$ at each location can be calculated by location measurements of the GNSS at two neighboring points as shown by Eq. 4-6. Alternatively, the GNSS may provide velocity measurements.

(D4) calculate range rate errors as Eq. 11

$$\delta \dot{S}_i = \begin{bmatrix} \dot{S}_{1i} - \dot{\tilde{S}}_1 \\ \dot{S}_{2i} - \dot{\tilde{S}}_2 \\ \vdots \\ \dot{S}_{ni} - \dot{\tilde{S}}_n \end{bmatrix}$$ Eq. 11

(D5) compare the range rate errors to a threshold; when the range rate errors are smaller than the threshold, exit.

(D6) update cell tower location according to Eq. 12-Eq. 16 when the range rate error is larger than the threshold $$\frac{\partial \dot{S}}{\partial \phi} = \left( \frac{\dot{\vec{S}}^T}{S} - \frac{\dot{S}}{S^2} \vec{S}^T \right) \left( -R_t \begin{bmatrix} -\sin Lat_E \cos Lon_l \\ -\sin Lat_E \sin Lon_l \\ \cos Lat_E \end{bmatrix} \right) +$$
$$\frac{\vec{S}^T}{S} \left( -\omega_e R_t \begin{bmatrix} \sin Lat_E \sin Lon_l \\ -\sin Lat_E \cos Lon_l \\ 0 \end{bmatrix} \right)$$ Eq. 12

$$\frac{\partial \dot{S}}{\partial \lambda} = \left( \frac{\dot{\vec{S}}^T}{S} - \frac{\dot{S}}{S^2} \vec{S}^T \right) \left( -R_t \begin{bmatrix} -\cos Lat_E \sin Lon_l \\ \cos Lat_E \cos Lon_l \\ 0 \end{bmatrix} \right) +$$
$$\frac{\vec{S}^T}{S} \left( -\omega_e R_t \begin{bmatrix} -\cos Lat_E \cos Lon_l \\ -\cos Lat_E \sin Lon_l \\ 0 \end{bmatrix} \right)$$ Eq. 13

$$Q = \begin{pmatrix} \frac{\partial \dot{S}_1}{\partial \phi} & \frac{\partial \dot{S}_1}{\partial \lambda} \\ \vdots & \vdots \\ \frac{\partial \dot{S}_n}{\partial \phi} & \frac{\partial \dot{S}_n}{\partial \lambda} \end{pmatrix}$$ Eq. 14

$$\begin{pmatrix} \delta \phi_i \\ \delta \lambda_i \end{pmatrix} = (Q^T Q)^{-1} Q^T (\delta \dot{S}_i)$$ Eq. 15

$$\begin{vmatrix} \phi_{i+1} \\ \lambda_{i+1} \end{vmatrix} = \begin{vmatrix} \varphi_i + \delta \phi_i \\ \lambda_i + \delta \lambda_i \end{vmatrix}$$ Eq. 16

(D7) return to (D3)

In another embodiment to position a cell tower, the geographic positioning device may use a RSSI based algorithm to determine the location of the cell tower based on RSSI measurements. The RSSI based algorithm can be shown by (R1) to (R7).

(R1) determine a first plurality of ranges $\tilde{S}_1, \tilde{S}_2, \tilde{S}_3, \ldots, \tilde{S}_n$ corresponding to N sample points based on RSSI measurements;

(R2) start with an initial estimate of latitude, longitude of the cell tower location:

$$\begin{pmatrix} \phi_0 \\ \lambda_0 \end{pmatrix}$$

(R3) for a cell tower location $$\begin{pmatrix} \phi_i \\ \lambda_i \end{pmatrix},$$

calculate a second plurality of ranges $S_{1i}, S_{2i}, S_{3i}, \ldots, S_{ni}$ based on GNSS measurements, as shown by Eq. 17-Eq. 19

$$\vec{R}_t = R_t \begin{bmatrix} \cos Lat_E \cos Lon_l \\ \cos Lat_E \sin Lon_l \\ \sin Lat_E \end{bmatrix} = \begin{pmatrix} X_t \\ Y_t \\ Z_t + alt \end{pmatrix}$$ Eq. 17

$$\vec{R}_r = \begin{pmatrix} X_r \\ Y_r \\ Z_r \end{pmatrix}$$ Eq. 18

$$S = \sqrt{(X_r - X_t)^2 + (Y_r - Y_t)^2 + (Z_r - Z_t)^2}$$ Eq. 19

(R4) calculate range errors as shown by Eq. 20

$$\delta S_i = \begin{bmatrix} S_{1i} - \tilde{S}_1 \\ S_{2i} - \tilde{S}_2 \\ \vdots \\ S_{ni} - \tilde{S}_n \end{bmatrix}$$ Eq. 20

(R5) compare the range errors to a threshold; when the range errors are smaller than the threshold, exit.

(R6) update cell tower location when the range errors are larger than the threshold, as shown by Eq. 21-Eq. 25

$$\frac{\partial S}{\partial \phi} = \frac{\vec{S}^T}{S} \left( -R_t \begin{bmatrix} -\sin Lat_E \cos Lon_l \\ -\sin Lat_E \sin Lon_l \\ \cos Lat_E \end{bmatrix} \right)$$ Eq. 21

$$\frac{\partial S}{\partial \lambda} = \frac{\vec{S}^T}{S} \left( -R_t \begin{bmatrix} -\cos Lat_E \sin Lon_l \\ \cos Lat_E \cos Lon_l \\ 0 \end{bmatrix} \right)$$ Eq. 22

-continued $$Q = \begin{pmatrix} \frac{\partial S_l}{\partial \phi} & \frac{\partial S_l}{\partial \lambda} \\ \vdots & \vdots \\ \frac{\partial S_n}{\partial \phi} & \frac{\partial S_n}{\partial \lambda} \end{pmatrix} \quad \text{Eq. 23}$$

$$\begin{pmatrix} \delta\phi_i \\ \delta\lambda_i \end{pmatrix} = (Q^T Q)^{-1} Q^T (\delta S_i) \quad \text{Eq. 24}$$

$$\begin{vmatrix} \phi_{i+1} \\ \lambda_{i+1} \end{vmatrix} = \begin{vmatrix} \varphi_i + \delta\phi_i \\ \lambda_i + \delta\lambda_i \end{vmatrix} \quad \text{Eq. 25}$$

(R7) return (R3)

While the invention has been described in conjunction with the specific exemplary embodiments thereof, it is evident that many alternatives, modifications, and variations will be apparent to those skilled in the art. Accordingly, exemplary embodiments of the invention as set forth herein are intended to be illustrative, not limiting. There are changes that may be made without departing from the spirit and scope of the invention.

What is claimed is:

1. A method for geographically positioning a receiver, comprising:
    storing, with the receiver, a location database of station devices fixed on earth surface according to routes of the receiver;
    receiving wireless signals from one or more station devices at a location on a route;
    obtaining identifications of the station devices from the wireless signals;
    searching the location database to obtain locations of the station devices based on the identifications; and
    determining location coordinates of the receiver based on the locations of the station devices and Doppler-frequency shifts of the wireless signals.

2. The method of claim 1, wherein storing, with the receiver, the location database of station devices fixed on earth surface according to routes of the receiver, further comprises:
    storing, with the receiver, a plurality of station devices in a linked list corresponding to a route of the receiver.

3. The method of claim 1, wherein determining the location of the receiver based on the location of the station devices and the Doppler frequency shifts of the wireless signals further comprises:
    determining the location of the receiver according to at least one of a trilateration algorithm, a centroid algorithm and a fingerprinting algorithm.

4. A method for geographically positioning a transmitting station, comprising:
    receiving, by a moving receiver, wireless signals from the transmitting station at a plurality of locations on a route near the transmitting station;
    determining geographic location information of the plurality of locations corresponding to the received wireless signals; and
    determining motion information of the moving receiver at the plurality of locations while receiving the wireless signal;
    determining location coordinates of the transmitting station based on the motion information at the plurality of locations and Doppler-frequency shifts of the wireless signals.

5. The method of claim 4, wherein determining the geographic location information of the plurality of locations corresponding to the received wireless signals, further comprises:
    determining the geographic location information based on a global navigation satellite system (GNSS).

6. The method of claim 4, further comprising:
    obtaining an identification of the transmitting station from the wireless signals; and
    updating a linked list corresponding to the route with a node corresponding to the transmitting station having the identification and the determined location information.

7. A geographic positioning device, comprising:
    a memory unit configured to store a location database of station devices fixed on earth surface according to routes of the geographic positioning device;
    a receiver module configured to receive wireless signals from one or more station devices;
    a processor module configured to identify the station devices based on the wireless signals, search the location database to obtain locations of the station devices, and determine location of the geographic positioning device based on the locations of the station devices and Doppler-frequency shifts of the wireless signals.

8. The geographic positioning device of claim 7, further comprising:
    a transmitter module configured to transmit a wireless signal including the determined location.

9. The geographic positioning device of claim 7, wherein the memory unit is configured to store a plurality of linked lists corresponding to a plurality of routes, and nodes in the linked lists correspond to the station devices.

10. The geographic positioning device of claim 7, wherein the processor is further configured to obtain an identification of a station device from a data packet decoded from a wireless signal emitted from the station device.

11. The geographic positioning device of claim 7, wherein the processor is further configured to determine the location of the geographic positioning device according to at least one of a trilateration algorithm, a centroid algorithm and a fingerprinting algorithm.

12. A geographic positioning device for positing a transmitting station, comprising:
    a receiver module configured to receive wireless signals from the transmitting station at a plurality of locations on a route near the transmitting station;
    a global navigation satellite system (GNSS) configured to determine geographic location information and motion information of the geographic positioning device at the plurality of locations; and
    a processor configured to determine a location of the transmitting station based on the geographic location information and the motion information at the plurality of locations and Doppler-frequency shifts of the wireless signals.

13. The geographic positioning device of claim 12, further comprising:
    a memory unit configured to store the Doppler frequency shifts corresponding to the plurality of locations.

14. The geographic positioning device of claim 13, wherein the processor is configured to determine the location of the transmitting station off-line based on data in the memory unit.

* * * * *